(12) United States Patent
Burkhardt et al.

(10) Patent No.: US 6,786,520 B2
(45) Date of Patent: Sep. 7, 2004

(54) MOTOR VEHICLE BUMPER AND MOTOR VEHICLE

(75) Inventors: Steffen Burkhardt, Herrenberg (DE); Dietmar Preissler, Hagenbuch (DE); Anton Sautner, Treuchtlingen (DE)

(73) Assignee: Dynamit Nobel Kunststoff GmbH, Weissenburg (DE)

( * ) Notice: Subject to any disclaimer, the term of this patent is extended or adjusted under 35 U.S.C. 154(b) by 0 days.

(21) Appl. No.: 10/298,164

(22) Filed: Nov. 15, 2002

(65) Prior Publication Data

US 2003/0141726 A1 Jul. 31, 2003

(30) Foreign Application Priority Data

Nov. 20, 2001 (DE) .......................................... 101 56 892

(51) Int. Cl.$^7$ .............................................. B60R 19/02
(52) U.S. Cl. ...................... 293/102; 293/120; 293/117
(58) Field of Search ................................ 293/102, 120, 293/133, 134, 117, 118, 155, 119, 136, 128, 132, 107, 126, 109, 93; 414/462; 224/42.21, 521; 428/31; 5/94; 296/136.03, 98, 93; 362/549, 496

(56) References Cited

U.S. PATENT DOCUMENTS

| | | | | |
|---|---|---|---|---|
| 3,700,273 A | * | 10/1972 | Jackson et al. | 293/134 |
| 3,836,188 A | * | 9/1974 | Klees | 293/120 |
| 3,933,385 A | * | 1/1976 | Sanford et al. | 293/136 |
| 4,231,600 A | * | 11/1980 | Braun et al. | 293/128 |
| 4,251,103 A | * | 2/1981 | Nakajima et al. | 293/102 |
| 4,357,040 A | * | 11/1982 | Tomioka et al. | 293/102 |
| 4,410,208 A | * | 10/1983 | Mulso et al. | 293/132 |
| 4,532,578 A | * | 7/1985 | Gaden et al. | 362/549 |
| 4,578,292 A | * | 3/1986 | Kanamori | 428/31 |
| 4,586,738 A | * | 5/1986 | Butler et al. | 293/107 |
| 4,597,603 A | * | 7/1986 | Trabert | 293/117 |
| 4,697,842 A | * | 10/1987 | Kawasaki | 293/117 |
| 4,786,093 A | * | 11/1988 | Nishii | 293/120 |
| 4,916,592 A | * | 4/1990 | Sultan et al. | 362/496 |
| 5,038,983 A | * | 8/1991 | Tomososki | 224/521 |
| 5,394,311 A | * | 2/1995 | Asano | 362/496 |
| 5,409,746 A | * | 4/1995 | Mimura | 296/93 |
| 5,688,006 A | * | 11/1997 | Bladow et al. | 293/120 |
| 5,957,512 A | * | 9/1999 | Inada et al. | 293/102 |
| 6,003,933 A | * | 12/1999 | Rinklin | 293/126 |
| 6,244,638 B1 | * | 6/2001 | Kuczynski et al. | 293/109 |
| 2003/0160464 A1 | * | 8/2003 | Burkhardt et al. | 293/102 |

FOREIGN PATENT DOCUMENTS

| | | | |
|---|---|---|---|
| DE | 36 19184 | * | 12/1987 |
| FR | 2 256 852 | * | 1/1974 |
| JP | 2000 326806 | * | 11/2000 |

* cited by examiner

*Primary Examiner*—Kiran Patel
(74) *Attorney, Agent, or Firm*—Fulbright & Jaworski L.L.P.

(57) ABSTRACT

The invention relates to a motor vehicle bumper with an inside bumper unit which can be fastened to a vehicle body and a bumper outside unit which is fastened section-wise to the bumper inside part. According to the invention the inside bumper unit supports the outside bumper unit solely in the area of its sill portion which is to be arranged under a vehicle trunk lid. Use for lightweight bumpers for motor vehicles.

7 Claims, 3 Drawing Sheets

MOTOR VEHICLE BUMPER AND MOTOR VEHICLE

Figure 1:
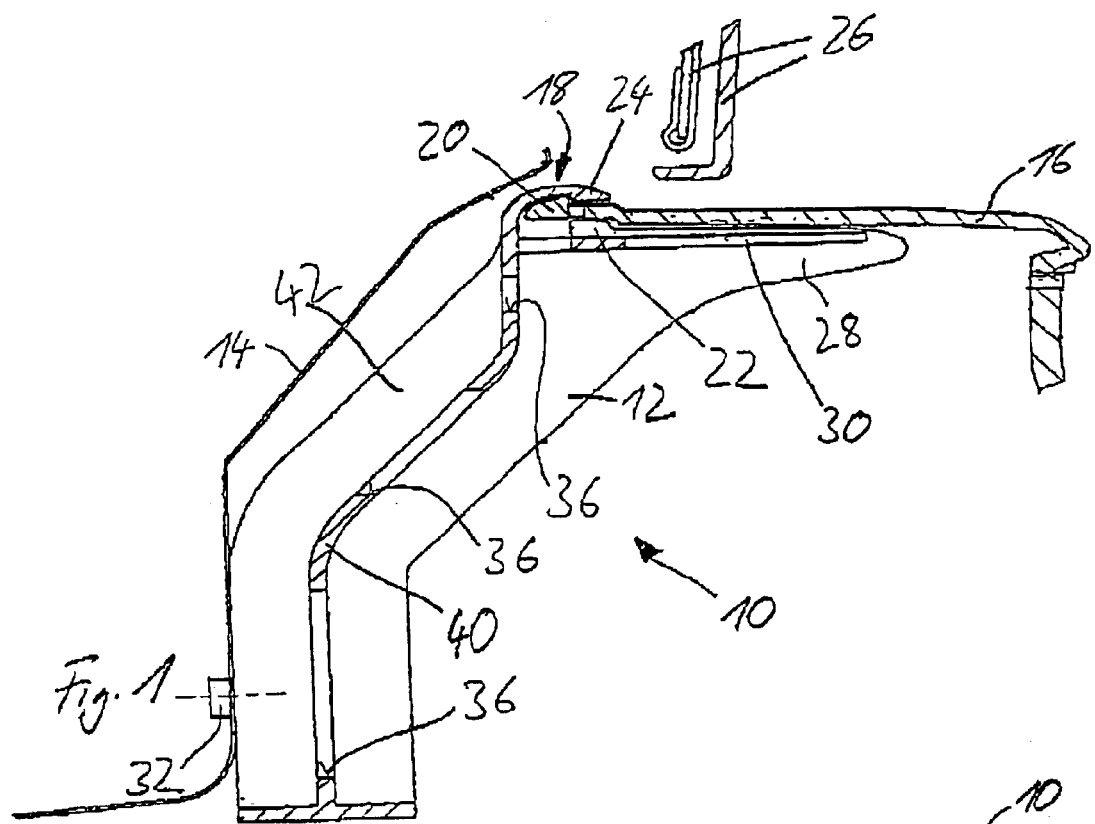

The invention relates to a motor vehicle bumper with a interior bumper unit which can be fastened to a vehicle body and an exterior bumper unit fastened section-wise to the interior bumper unit.

German Patent 27 02 691 C3 has disclosed a motor vehicle bumper with an interior motor vehicle bumper unit and an exterior bumper unit. To affix the exterior bumper unit the latter is pushed over the interior unit and fastened to it with snap fasteners. The exterior bumper unit consists of plastic. For the support of the exterior bumper unit the latter is supported on its full surface by the interior part below its upper as well as its lower edge. The interior bumper unit is configured as a rigid support which is fastened to a vehicle with mountings of energy-absorbing construction.

A motor vehicle bumper disclosed in European Patent 0 430 665 B1 (FIG. 8) has an exterior unit and an interior unit supporting the exterior unit. In normal operation, a heavy stress on the bumper is to be expected only in the area of the rear sill portion. Since only this heavily stressed part is supported, a saving of material and weight can be achieved in comparison with conventional bumpers whose interior units support an exterior unit over the entire width of the upper and lower side.

A saving of weight and material is to be achieved by the invention in a motor vehicle bumper.

For this purpose, according to the invention, a motor vehicle bumper is provided with an interior bumper unit which can be fastened to a vehicle body, and an exterior bumper unit which can be fastened section-wise to the interior bumper unit, wherein the interior bumper unit support the exterior bumper unit only at rear sill portion of the exterior bumper unit, which is to be situated beneath a motor vehicle's trunk lid.

In normal operation of the vehicle great stress upon the bumper is to be expected only in the area of the rear sill. Since only this latter, highly stressed area is supported, a saving of material and weight in comparison with conventional bumpers whose interior portions support an external portion over the entire width of the upper or lower side.

In further embodiment of the invention, the interior bumper unit has a ribbed structure.

By these measures a very great stiffness can be achieved, accompanied by a saving in weight.

It is likewise advantageous to provided the interior bumper unit with cutouts.

In this manner, material and weight can be saved without impairing the stiffness of the interior part.

In further embodiment of the invention, the interior bumper unit runs from the first fastening means for fastening the vehicle body toward the rear sill portion, substantially along the vehicle body, and has underneath the sill portion at least one balcony-like projection reaching in the direction of the length of the vehicle.

By these measures space can be created for a plastic deformation of the exterior bumper unit as well as for any energy-absorbing components. Furthermore, in the space available below the balcony, components such as sensors, antennas or the like can be disposed. Nevertheless, the area of the rear sill portion is supported. An additional saving of material and weight can be achieved by balconies disposed side by side in the transverse direction of the vehicle.

In further embodiment of the invention the interior bumper unit has a clip strip running transversely across the vehicle, into which an edge of the exterior bumper unit facing the vehicle body is clipped. Advantageously, the clip strip is provided with retaining ribs running in the lengthwise direction of the vehicle and substantially perpendicular to the transverse direction of the vehicle.

By these measures an edge of the exterior bumper unit, provided if desired with catch means, can be held. By means of the clip ribs a secure fastening as well as a saving of material as compared with a full-surface clip strip. For the adjustment of the fastening, clip ribs are easier to adapt than a full-surface ramp or strip. This is especially advantageous if the clip strip is made of injection-molded plastic and an injection mold is to be adapted to it.

The problem on which the invention is based is also solved by a motor vehicle with a bumper according to the invention in which a deformation body is fastened to the vehicle body underneath the interior bumper unit and is covered by the exterior bumper unit.

This division into deformation body and interior unit makes it possible to select the materials of the interior unit and deformation body according to their function. For example, the interior unit can consist of injection-molded plastic while the deformation body is made of aluminum.

Additional features and advantages of the invention will be found in the claims and in the following description of a preferred embodiment of the invention, in conjunction with the drawings, wherein FIG. 1 is a fragmentary sectional view of a bumper according to the invention, applied to a motor vehicle, FIG. 2 another fragmentary sectional view of the interior bumper unit, FIG. 3 a perspective view of the interior bumper unit of FIG. 1, and FIG. 4 another perspective view of the interior bumper unit of FIG. 1.

In the fragmentary sectional view of FIG. 1 there is represented a portion of motor vehicle's bumper 10 pursuant to the invention, which is affixed to a motor vehicle body 14. Only a portion of the exterior bumper unit 16 is shown, and is fastened to the interior bumper unit 12 by the fact that an edge of the exterior bumper unit 16 has been inserted into a clip strip 18 of the interior bumper unit. The clip strip 18 of the interior bumper unit 12 has a notch into which a catch projection 20 resiliently disposed on the exterior bumper unit is engaged. An opening in the clip strip 18 to accommodate the edge of the exterior bumper unit is defined on its bottom by clip ribs 22 arranged parallel to the length of the vehicle and at right angles to its width, only one of them being seen in FIG. 1. A strip-like projection 24 forms the upper boundary, in FIG. 1, of the opening in the clip strip 18. The strip-like projection 24 bears the notch for engaging the catch projection 20 of the exterior bumper unit.

Upon the insertion of the front edge of the exterior bumper unit 16 into the clip strip 18, the latter is first guided by the clip ribs 22 and the strip-like projection 24. As the insertion of the exterior bumper unit 16 continues, the catch projection 20 snaps into the notch of the strip-like projection 24, and furthermore the exterior bumper unit becomes gripped between the clip ribs 22 and the strip-like projection 24.

The horizontal section of the exterior bumper unit 16 represented in FIG. 1 forms the area of a rear sill portion which is situated beneath a merely indicated trunk lid 26. When a vehicle is loaded, this sill portion area is subjected to stress, for example when goods are set down on the sill portion area. To stabilize the rear sill portion area, the interior bumper unit 12 has a balcony-like projection 28 running in the direction of the vehicle's length underneath the rear sill portion area. The projection 28 consists of a rib disposed parallel to the vehicle's length and perpendicular to the width of the vehicle and provided with a perpendicular stiffening rib 30. Above the stiffening rib 30 the projection 38 merges with the clip rib 22.

The interior bumper unit is connected to the vehicle body 14 by a bolt 32 indicated schematically. The interior bumper unit 12 extends from the bolt 32 along the vehicle's body 14 and then turns away from the vehicle body 14 in the area of the rear sill portion underneath the sill portion area of the exterior bumper unit 16. A deformation space is thereby created between the exterior bumper unit 16 and the vehicle body 14, which can be used for energy absorption during a collision of the vehicle.

Figure 2:
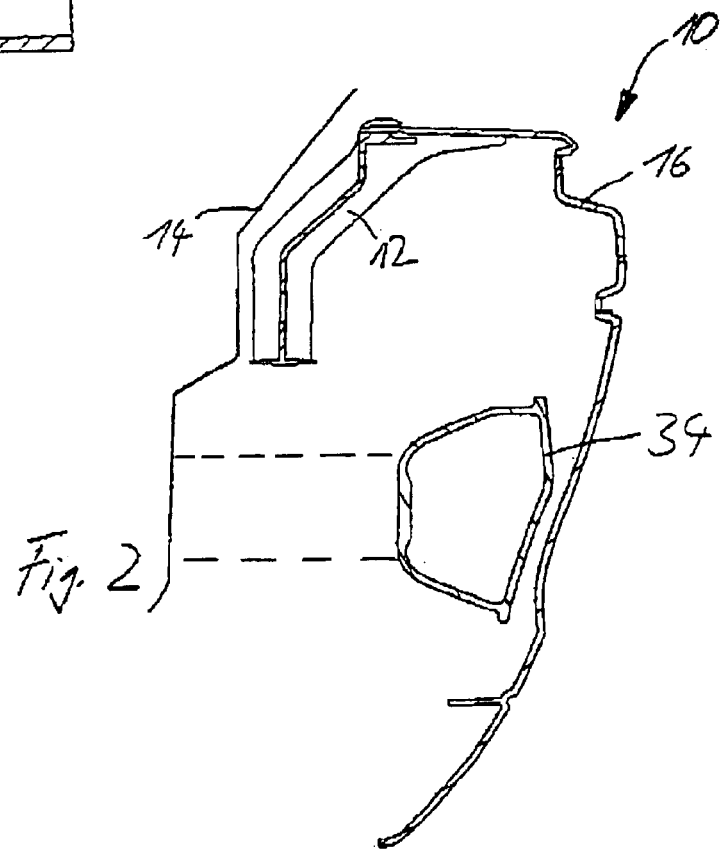

As it is shown in FIG. 2, a deformation body 34 is arranged within this space between the exterior bumper unit 16 and the vehicle body 14. The deformation body 34 consists of a hollow aluminum profile and is fastened by means of supports indicated by broken lines to the vehicle's body. By separating the deformation body 34, the energy-absorbing hollow profile and bumper 10, the latter can better compensate for tolerances of the car body 14, since the hollow profile does not add rigidity to the bumper 10.

In FIG. 1 can be seen the ribbed configuration of the interior bumper unit 12 which has a great stiffness due to components of large area arranged perpendicular to one another, such as the projection 28 and the rib 30. To save weight and material the surfaces can be provided partially with cutouts 36.

Figure 3:
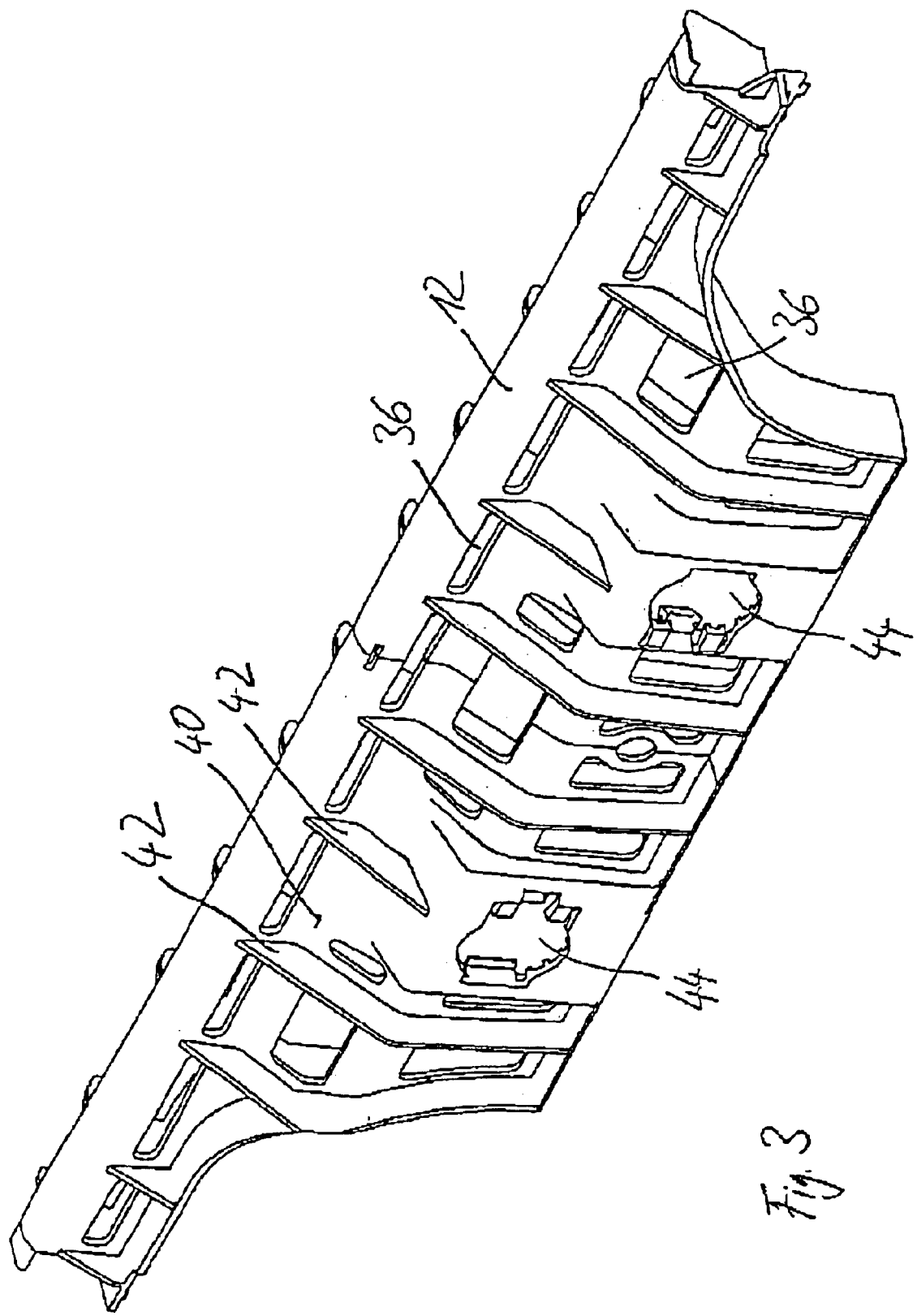

A perspective view of the interior bumper unit 12 as seen from the vehicle body is represented in FIG. 3. Easy to see is the ribbed configuration of the interior bumper unit with a curved plate 40, and ribs 42 arranged perpendicular thereto. Plate 40 is provided with numerous cutouts 36. Also to be seen are two cutouts 44 with hooks which are provided in order to hold plates provided with bolts for fastening the interior bumper unit 12 to the vehicle body. The interior bumper unit 12 extends only over the width of the back sill portion in the transverse direction of the vehicle. The exterior bumper unit is thus supported only locally, so that the interior bumper unit 12 can be made substantially smaller and lighter in comparison with conventional interior bumper units.

Figure 4:
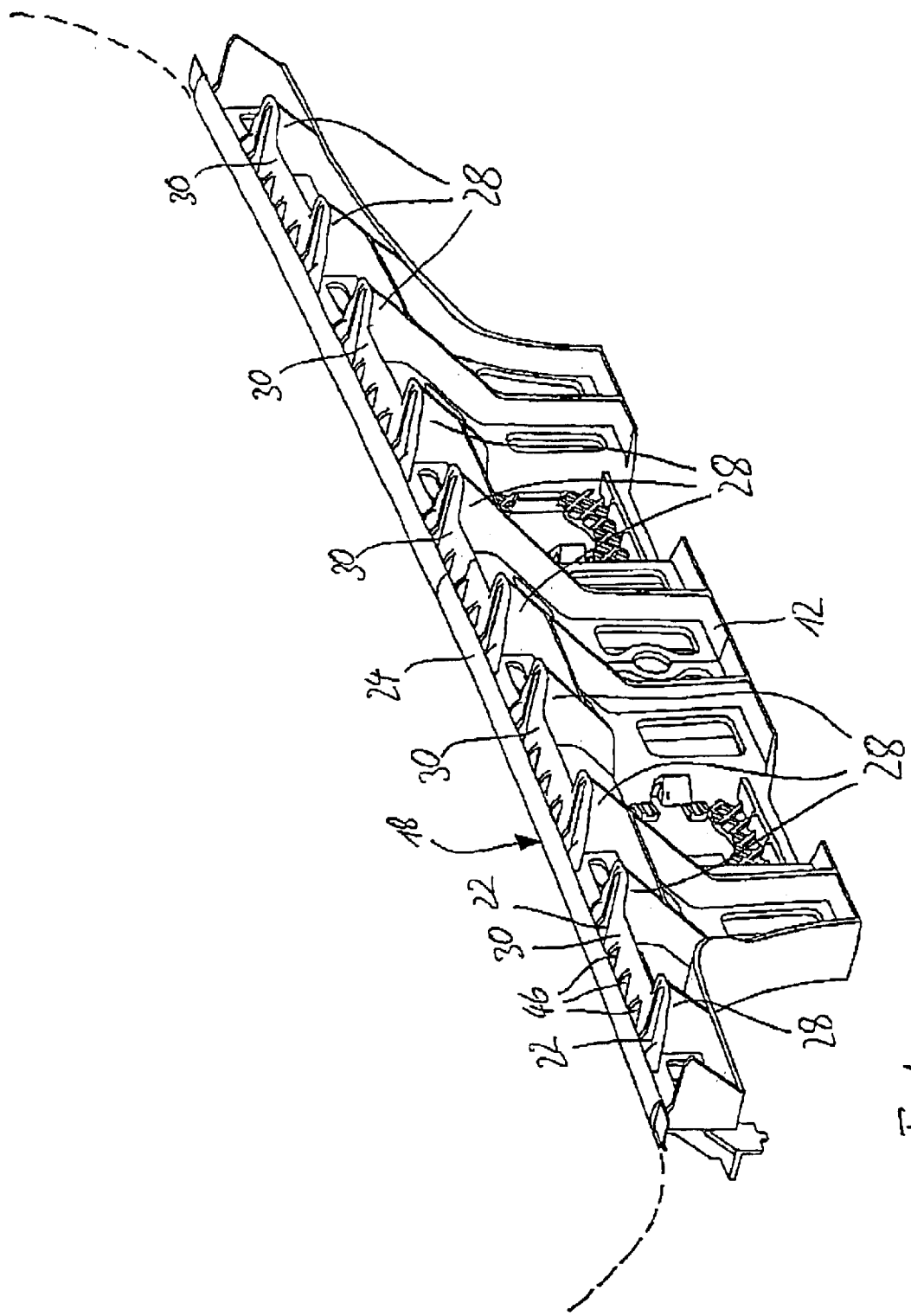

The perspective view in FIG. 4 shows the interior bumper unit 12 as seen from the side of the exterior bumper unit. Shown are the balcony-like projections 28 for supporting the rear sill portion of the exterior bumper unit. Over the length of the rear sill portion running transversely across the vehicle's width a total of ten projections 28 are arranged in pairs. Two projections 28 of a pair are joined together by ribs 30. Thus each pair of balcony projections 28 in direction Z, i.e., in the direction of the height of the vehicle, forms an extremely stable combination and they are deformable, yet energy-absorbing, in direction X, i.e., in the direction of the vehicle's length. On the rib 30, in the area of each balcony-like projection, a clip rib 22 is disposed, which extends from the clip strip 18 all the way to the end part of the projection 28. Furthermore, shorter clip ribs 46 are disposed on the rib 30 parallel to the clip ribs 22. While the clip ribs 22 are provided in their forward area near the balcony-like projection 28 for the introduction of an edge of the exterior bumper unit into the clip strip 28, the section of clip ribs 22 lying under the projection 24 of the clip strip 22 as well as the clip ribs 46 lying also underneath the projection 24 serves to grip the edge of the exterior bumper unit tightly in the clip strip 18.

As it has been explained, the interior bumper unit 12 supports the exterior bumper unit only in the area of the rear sill portion. As it is indicated in FIG. 4, the interior bumper unit 12 terminates in the transverse direction of the vehicle in the area of the exterior bumper unit, since the rear sill portion merges with an upwardly bent area. The support of the rear sill portion by the interior bumper unit 12 thus ends in an area wherein stress is no longer applied to the bumper in daily operation, or in which the exterior bumper unit is given sufficient inherent stiffness by its shape. The upwardly curved areas adjoining the rear sill portion area on the right and left are indicated in broken lines in FIG. 4 and indicate the shape of a vehicle trunk lid arranged above the rear sill portion area.

What is claimed is:

1. A motor vehicle bumper having an interior bumper unit which can be affixed to a motor vehicle body, and an exterior bumper unit which can be affixed section-wise to the interior bumper unit, wherein the interior bumper unit supports the exterior bumper unit exclusively in the rear sill portion of the exterior bumper unit to be arranged below a vehicle trunk lid, wherein the interior bumper unit has a clip strip running in the transverse direction of the vehicle, into which an edge of the exterior bumper unit facing the vehicle body is clamped.

2. The motor vehicle bumper according to claim 1, wherein the interior bumper unit has a ribbed structure.

3. The motor vehicle bumper according to claim 1, wherein the interior bumper unit is provided with cutouts.

4. The motor vehicle bumper according to claim 1, wherein the interior bumper unit runs substantially along the vehicle body, from a first fastening means for its fastening to the vehicle body, toward the still portion, and beneath the area of the sill portion it has a balcony-like projection which extends in the lengthwise direction of the vehicle.

5. The motor vehicle bumper according to claim 1, wherein said clip strip is arranged directly underneath the trunk lid.

6. The motor vehicle bumper according to claim 5, wherein the clip strip is provided with clamping ribs disposed substantially perpendicular to the transverse direction of the vehicle.

7. The motor vehicle bumper according to claim 1, wherein a deformation body is fastened to the vehicle body underneath the interior bumper unit and is covered by the exterior bumper unit.

\* \* \* \* \*